US011605872B2

(12) United States Patent
Wu et al.

(10) Patent No.: US 11,605,872 B2
(45) Date of Patent: Mar. 14, 2023

(54) TILTED ANGLE SELECTION OF COLLOCATED ANTENNAS ON DOWNHOLE RESISTIVITY TOOLS

(71) Applicant: Halliburton Energy Services, Inc., Houston, TX (US)

(72) Inventors: Hsu-Hsiang Wu, Sugarland, TX (US); Yijing Fan, Singapore (SG); Jin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 105 days.

(21) Appl. No.: 16/709,040

(22) Filed: Dec. 10, 2019

(65) Prior Publication Data

US 2021/0175597 A1   Jun. 10, 2021

(51) Int. Cl.
| | |
|---|---|
| *H01Q 1/04* | (2006.01) |
| *H01Q 25/00* | (2006.01) |
| *G01V 3/28* | (2006.01) |
| *G01V 3/30* | (2006.01) |
| *E21B 47/13* | (2012.01) |
| *E21B 47/026* | (2006.01) |
| *E21B 47/017* | (2012.01) |

(52) U.S. Cl.
CPC ............. *H01Q 1/04* (2013.01); *E21B 47/017* (2020.05); *E21B 47/026* (2013.01); *E21B 47/13* (2020.05); *G01V 3/28* (2013.01); *G01V 3/30* (2013.01); *H01Q 25/00* (2013.01)

(58) Field of Classification Search
None
See application file for complete search history.

(56) References Cited

U.S. PATENT DOCUMENTS

| | | |
|---|---|---|
| 10,024,996 B2 | 7/2018 | Ma et al. |
| 2004/0000911 A1 | 1/2004 | Morys |

(Continued)

FOREIGN PATENT DOCUMENTS

| | | |
|---|---|---|
| WO | 2005050777 A2 | 6/2005 |
| WO | 2011129828 A1 | 10/2011 |
| WO | 2014003702 A1 | 1/2014 |

OTHER PUBLICATIONS

PCT Application Serial No. PCT/US2019/065564, International Search Report, dated Sep. 1, 2020, 5 pages.

(Continued)

*Primary Examiner* — Douglas X Rodriguez
(74) *Attorney, Agent, or Firm* — Delizio, Peacock, Lewin & Guerra

(57) ABSTRACT

A method comprises determining a plurality of responses at a plurality of tilted angles for multiple coils of a collocated antenna assembly based on at least one coil parameter of the collocated antenna assembly, wherein the at least one coil parameter comprises at least one of a number of coil turns, a coil size, and a number of coils. The method includes determining crosstalk between the multiple coils at each of the plurality of tilted angles from the plurality of responses. The method includes determining a signal-to-noise ratio for each of the plurality of tilted angles based on the crosstalk. The method also includes selecting a tilted angle for the collocated antenna assembly corresponding to an optimal signal-to-noise ratio of the determined signal-to-noise ratios.

19 Claims, 9 Drawing Sheets

(56) References Cited

U.S. PATENT DOCUMENTS

| | | | |
|---|---|---|---|
| 2006/0103389 A1* | 5/2006 | Bespalov | E21B 47/002 |
| | | | 324/338 |
| 2012/0001637 A1 | 1/2012 | Bittar et al. | |
| 2013/0141102 A1* | 6/2013 | Donderici | G01V 3/18 |
| | | | 324/338 |
| 2013/0311094 A1* | 11/2013 | Donderici | G01V 3/08 |
| | | | 702/57 |
| 2016/0116627 A1* | 4/2016 | Frey | G01V 3/30 |
| | | | 324/338 |
| 2016/0370490 A1 | 12/2016 | Bittar | |
| 2017/0269254 A1 | 9/2017 | Ma et al. | |
| 2019/0137646 A1* | 5/2019 | Frey | G01V 3/30 |

OTHER PUBLICATIONS

PCT Application Serial No. PCT/US2019/065564, International Written Opinion, dated Sep. 1, 2020, 4 pages.

\* cited by examiner

| DESIGN | PHYSICAL RELATIVE AZIMUTH BETWEEN THE TWO ANTENNAS | PHYSICAL TILTED ANGLE OF EACH ANTENNA | SIMULATED EFFECTIVE ANGLE OF EACH ANTENNA | CROSS TALK (dB) BETWEEN THE TWO ANTENNAS |
|---|---|---|---|---|
|  | φ° | (α−3)° | (Θ−5)° | −35.9 |
|  | φ° | (α−2)° | (Θ−4)° | −40.55 |
|  | φ° | (α−1)° | (Θ−2)° | −50.3 |
|  | φ° | α° | Θ° | −79.5 |
|  | φ° | (α+1)° | (Θ+2)° | −50.3 |
|  | φ° | (α+2)° | (Θ+2)° | −44.54 |
|  | φ° | (α+3)° | (Θ+5)° | −37.44 |

TILTED ANGLE SELECTION OF COLLOCATED ANTENNAS ON DOWNHOLE RESISTIVITY TOOLS

TECHNICAL FIELD

The disclosure generally relates to the field of antennas and more particularly to tilted angle selection of collocated antennas mounted on downhole resistivity tools.

BACKGROUND

During drilling operations for oil and gas production, a variety of measurement techniques are used to obtain information about a geologic formation. The measurements help characterize the formation surrounding a wellbore. One such measurement is electromagnetic resistivity, or its inverse conductivity, which can be used to indicate features of the formation, such as porosity. Resistivity tools often use one or more antennas coupled to or associated with a wellbore logging tool to obtain resistivity measurements. The antennas include one or more coils wrapped around an axial section of the tool, such as a drill collar.

The resistivity tools generate magnetic fields using the one or more coils wrapped around a portion of the tool. Multiple antennas are axially spaced along the tool with each coil either coaxial with or angularly offset (tilted) from the tool axis. When current is supplied to the coils, each coil generates a magnetic dipole moment orthogonal to the tilt of the coil. Each dipole moment generates a magnetic field offset from the tool axis and opposite the tilt angle that can be used to measure resistivity of a formation.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to a collocated antenna design with two antenna coils in illustrative examples. Embodiments of this disclosure can be also applied to collocated antennas with three or more antenna coils. In other instances, well-known instruction instances, protocols, structures and techniques have not been shown in detail in order not to obfuscate the description.

Various embodiments can include a process for design and development of a collocated antenna assembly to achieve optimal collocated antenna design based on evaluation of the crosstalk effect of each collocated antenna. A systematic approach can be used to include each component of the assembly to determine the effects of varying design parameters. These components can include coils, ferrites, and shield design. Other components of a resistivity tool, such as collars, may also be included. An evaluation of crosstalk and interference among the coils of the antenna assembly, as well as sensitivity of an effective antenna angle, determines an optimal physical tilted angle of each coil. After ensuring the desired antenna orientation, ferrites and a shield can be incorporated into a determination of an optimal antenna gain. Thus, various embodiments can include a process for acquiring optimal gain performance and desired antenna orientation, or effective angle. In some embodiments, operations can incorporate any number of coils that share the same shield and ferrites and are localized to the same area of a measurement tool.

Example Response Simulator for a Collocated Antenna Assembly

Figure 1:
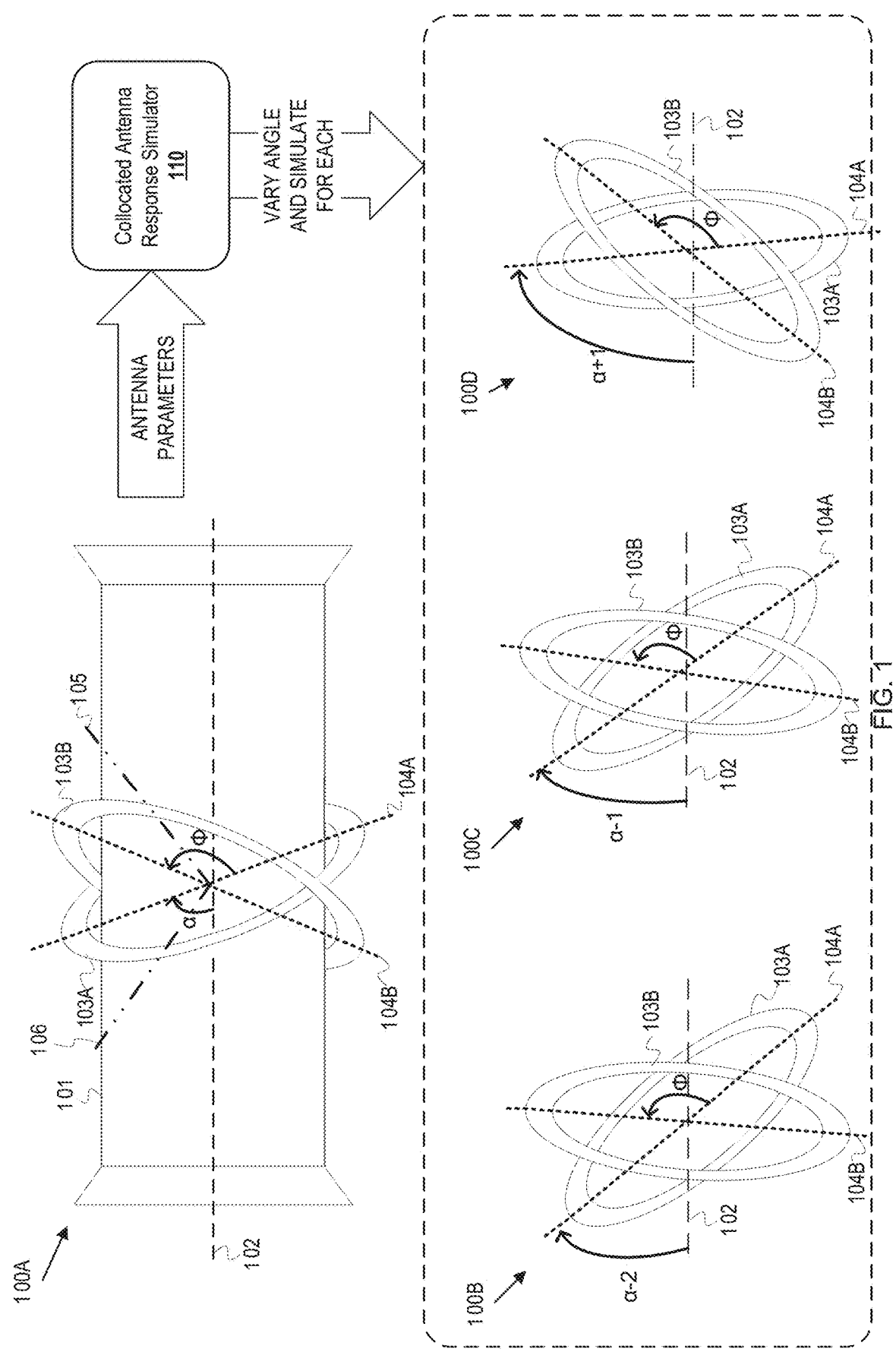
FIG. 1 is an example response simulator varying tilted angles of a collocated antenna assembly.

FIG. 1 is an example response simulator varying tilted angles of a collocated antenna assembly. Collocated antennas can be used as part of electromagnetic resistivity tools because they are condensed to a single location on the tool. Collocated antennas include multiple coils wrapped at various angular configurations around an axial portion of the tool, allowing for a reduction in tool length, which results in tool production cost reductions, especially for logging while drilling (LWD) tools with expensive metal components. Collocated antennas also allow measurements to be achieved at the same reference point which can simplify calculations. While a collocated antenna design reduces the overall dimension of an antenna section of a resistivity tool, crosstalk between the coils impacts the measurement accuracy. Optimizing the antenna angle reduces crosstalk and improves the accuracy of the resistivity measurements. Additionally, choosing the appropriate configuration of ferrites and shields for a collocated antenna to achieve accurate antenna orientation and optimal antenna gain of each collocated coil can be important.

FIG. 1 depicts the simulated variations for a collocated antenna assembly 100A as a series representations of simulations 100B-100D of tilted angles used in a process for determining an optimal effective angle and crosstalk for the collocated antenna assembly 100A. Each depiction represents a pair of collocated antennas at various tilted angles. While the assembly 100A depicts a mandrel and simulation representations 100B-100D do not show the mandrel for ease of illustration, it is understood that the simulation representations 100B-100D are of the collocated antenna assembly 100A, including the mandrel. As such, like numerals between the figures represent the same element of the collocated antenna assembly in various angular positions.

The collocated antenna assembly 100A is illustrated with a side view of the collocated antenna assembly 100A on a mandrel 101. The mandrel 101 may be an axial section of a resistivity logging tool. The mandrel 101 has an axial line of symmetry 102. Circumferentially surrounding the mandrel 101 are two collocated coils 103A and 103B. While depicted as a single loop for simplicity in FIG. 1, the coils 103A and 103B may include any number of consecutive turns or windings around the mandrel. Each turn of the coil extends 360-degrees about the mandrel. Each coil 103A and 103B has an axis of symmetry 104A and 104B, respectively, that is parallel to the loop of the coil. Coils 103A and 103B have a relative azimuth angle between the two axis of symmetry 104A and 104B, represented by angle 1. Coil 103A is tilted at an angle α from the axial line of symmetry 102. Angle α is a winding or tilt angle that defines the angular offset from the axial line of symmetry 102 of the mandrel 101 to an axis 105 of coil 103A. Perpendicular to the axis of symmetry 104A, axis 105 represents the maximum radiation response of the magnetic field generated by the coil 103A. Coil 103B has a similar axis 106 which is perpendicular to the axis 104B and generates a magnetic field with a maximum radiation response in the direction of axis 106. The magnetic fields generated by each of the coils combine to form an effective magnetic field. The effective magnetic field is generated at an effective angle related to the axes 105 and 106. The effective angle is also impacted by the size of each of the coils and the properties of the mandrel.

The winding angle determines the directivity pattern of the antenna. When current passes through a coil in the collocated antenna assembly, a dipole magnetic field is generated that extends radially outward from the antenna. The dipole moment extends orthogonal to the winding angle of the coil. The dipole moment generates a magnetic field that is offset from the tool at an angle equal and opposite to the winding angle. Adjusting the winding angle of an antenna varies the angle of the maximum radiation response of the magnetic field. Including multiple tilted antennas allows multiple magnetic fields with different angles of maximum radiation response to be used to determine formation resistivity.

The simulation 100B is the collocated antenna assembly 100A rotated to a tilt angle of α−2. The simulation 100C is the collocated antenna assembly 100A rotated at a tilt angle α−1. The simulation 100D is the collocated antenna assembly 100A rotated to a tilt angle of α+1. Each of these simulations maintains a constant physical relative azimuth angle between the two antenna coils. Adjusting the tilt angle varies the effective angle. A collocated antenna response simulator 110 simulates the effective angle and crosstalk between the antenna coils based on the depicted tilt angles. The collocated antenna response simulator 110 performs the simulations based on parameters that describe the physical antenna assembly 100A. While examples of four different tilt angles are depicted, more tilt angles may be input into the collocated antenna response simulator 110. The process for simulating the effective angle and crosstalk at each of the various tilt configurations depicted in FIG. 1 is described in further detail in FIG. 2.

Example Operations

Figure 2:
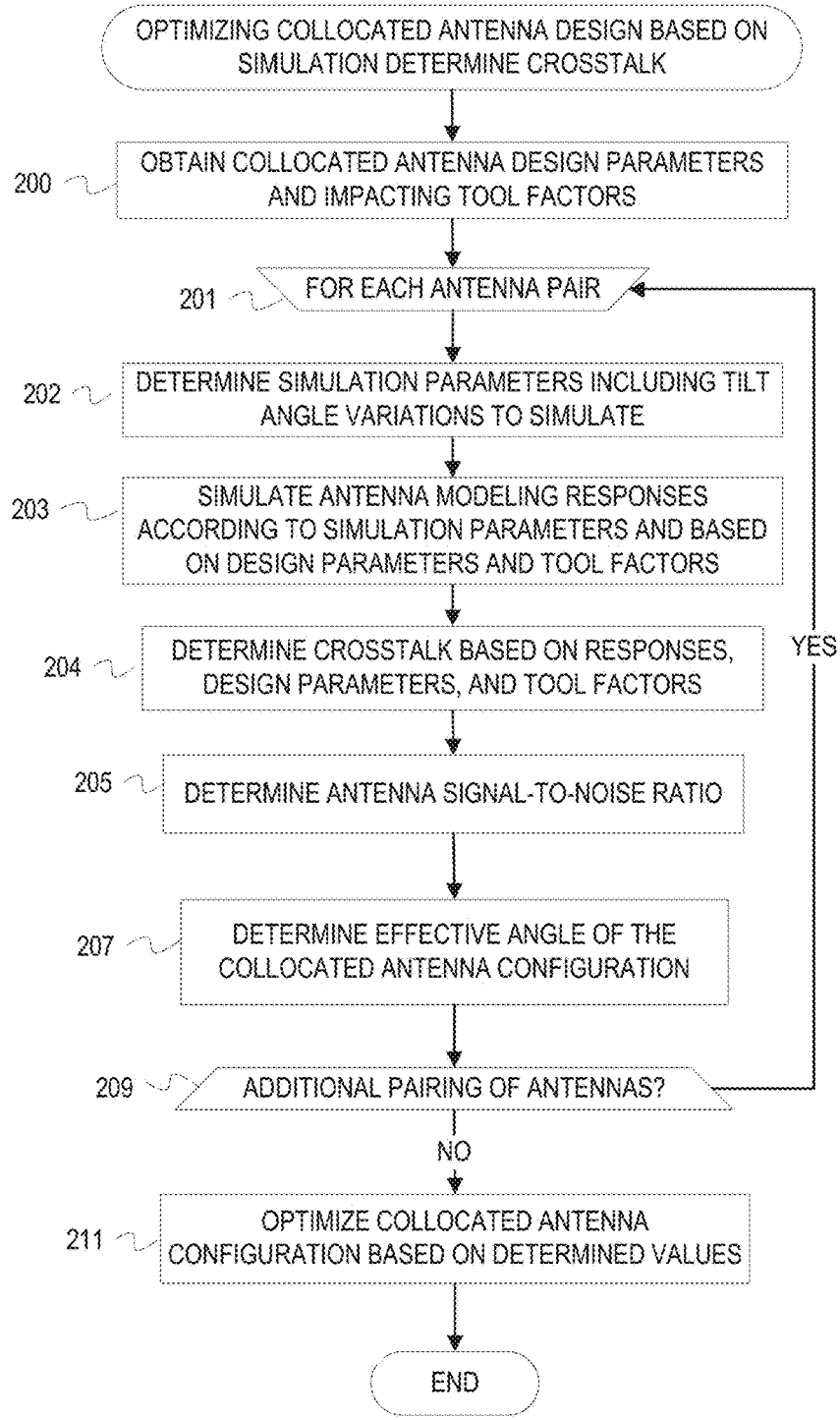
FIG. 2 is a flowchart of operations for optimizing collocated antenna design.

FIG. 2 is a flowchart of operations for optimizing collocated antenna design based on simulation determined crosstalk. FIG. 2 includes operations that can be performed by hardware, software, firmware, or a combination thereof. For example, at least some of the operations can be performed by a processor executing program code or instructions. The description refers to a program code that performs operations as a "collocated antenna response simulator" although it is appreciated that program code naming and organization can be arbitrary, language dependent, and/or platform dependent. Operations of the flowchart of FIG. 2 start at block 201.

At block 200, the collocated antenna response simulator obtains design parameters for the collocated antenna and impacting tool factors. The design parameters can be read from a file or input via a user interface, as examples. Examples of the design parameters include number of antennas, turns, and coil size. Examples of the impacting tool factors include factors of tool components, such as a mandrel material, that can impact crosstalk between the antennas.

At block 201, the collocated antenna response simulator selects a pair of antennas of the collocated antenna design. If the collocated antenna only has 2 antennas, then this selection is implicit. For a collocated antenna design with more than 2 antennas, the collocated antenna response simulator will run varying angle simulations for each different pairing of antennas possible for the design.

At block 202, the collocated antenna response simulator determines one or more simulation parameters that at least include a number of tilt angle variations. The collocated antenna response simulator is configured or programmed to simulate n tilt angles from an initial tilt angle for the selected antenna pair. The collocated antenna response simulator is also configured or set with the amount of angle adjustment or variation, for example 1 degree for each simulation. The collocated antenna response simulator is also configured or programmed to adjust in one direction of change (increasing or decreasing) or in both directions from the initial title angle.

At block 203, the collocated antenna response simulator simulates responses for the collocated according to the simulation parameters and based on a physical collocated antenna configuration. The collocated antenna response simulator simulates resistivity measurements by a collocated antenna at a given angular orientation of the pair of antenna coils of the collocated antenna. For example, the simulator may start with an angular orientation of 45°. This may be selected as a starting configuration due to ease of physical construction of the antenna coils, but any angle may be used for the starting simulation angle. The collocated antenna response simulator simulates resistivity measurements at the starting simulation angle. The angular configuration is varied, and the simulated responses at the new angular configuration are recorded. This is done for multiple angular configurations at higher and lower angular values from the starting simulation angle. For the example of a starting simulation angle at 45°, angles of 42°, 43°, 44°, 46°, 47°, and 48° may be used. More angles may be simulated to improve accuracy of the simulation.

At block 204, crosstalk for the collocated antenna assembly is determined based on the simulated responses, the design parameters, and the tool factors. Since the antenna coils are on top of each other in a collocated antenna assembly, crosstalk, or signal interference, occurs at varying intensity based on the orientation of each antenna coil. Crosstalk is influenced by the drill collars and other antenna coils in the collocated antenna assembly as well as the coil orientation. Small coupling signals among the antenna coils ensure that a transmitting antenna transmits most of its energy to the formation and a receiving antenna only receives the signals from a transmitter antenna and the formations surrounding the receiving antenna. The collocated antenna response simulator simulates the power (and/or voltage) supplied to the antenna coils that would allow the antenna coils to emit a field into the surrounding formation and measures the corresponding simulated power output by the antenna coils. The crosstalk (in decibels) is determined based on the simulated input and output powers for each angular configuration modeled in block 203.

At block 205, an antenna signal-to-noise ratio (SNR) is determined for each simulated tilted angle. The SNR for each simulated tilted angle is determined from the modeled responses and the crosstalk. The SNR is a ratio of the power of the signal to the power of the crosstalk. The power of a signal is determined by the amplitude of the signal. The collocated antenna response simulator models signals emitted from the antenna and the crosstalk for each angular configuration of the antenna. The SNR at each configuration is calculated based on the modeled responses.

Figure 3:
FIG. 3 is a table of collocated antenna design parameters.
Figure 3:
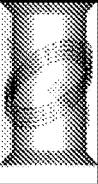
Figure 3:
Figure 3:
Figure 3:
Figure 3:
Figure 3:
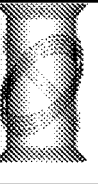

At block 207, an effective angle is determined for each simulated angle. In an isolated situation including only the collocated antenna coils, the field emitted by the collocated antenna assembly would directly correspond to the angular configuration of the coils. When the collocated antenna coils are used in a resistivity logging tool, components of the tool alter the angle of the emitted field. The conductivity of the mandrel as well as the size of the coil impact the angle of the emitted field. The angle of the emitted field as affected by the resistivity logging tool component is known as the effective angle. The collocated antenna response simulator models the effect of the mandrel on the coil to obtain a simulated effective angle of each simulated angular configuration of the coils. FIG. 3 depicts results of an example simulation as in blocks 201-204.

FIG. 3 is a table of collocated antenna design parameters. The first column of the table, the design column, depicts a visual representation of the collocated antenna orientation. Each row of the design column includes a visual simulation of the orientation of the coils of the collocated antenna. The second column of the table represents the physical relative azimuth between the two antenna coils. For a simulation, a physical relative azimuth angle $\Phi°$ is selected as the reference angle for all simulations. The third column of the table lists the physical tilted angle of each antenna coil of the collocated antenna. A physical tilted angle $\alpha°$ is selected as a starting point for simulation. The simulated effective angle of each antenna (column 4) and crosstalk between the two antenna coils (column 5) are determined for $\alpha°$. Simulations are conducted for a range of physical tilted angles surrounding $\alpha°$. For the example simulations performed in the table of FIG. 3, six different angles symmetrically surround $\alpha°$ were studied. The simulation predicts that, in general, the simulated effective angle of each antenna $\Theta°$ has a greater variance the farther the physical tilted angle is from $\alpha°$. The crosstalk between the two antenna coils also exhibits a symmetric trend around $\alpha°$. A minimum in the crosstalk simulated data can be seen at $\alpha°$. The spike in the crosstalk values and the symmetry of the simulated effective angle around $\Theta°$ verify the selection of $\alpha°$ for the physical tilted angle of the antenna.

At block 209, the collocated antenna response simulator determines whether there is an additional pairing of antennas to evaluate based on the design parameters. If there is another pairing to evaluate, program flow returns to block 201 for selection of the next pairing. Otherwise, program flow continues to block 211.

At block 211, a collocated antenna configuration is optimized based on the determined values. Optimizing the collocated antenna configuration includes selecting the physical tilted angle for the antenna coils that corresponds to a minimum crosstalk signal. Ferrites and a shield are added to the collocated antenna assembly to protect the coils from damage. The ferrites provide a boundary between the coils and the mandrel while the shield protects the coils from damage due to the drilling environment downhole. The ferrites and shield are designed for protection but can also be used to optimize gain performance of the collocated antenna assembly for the effective angle. Gain performance refers to the degree to which the collocated antenna concentrates a signal the emitted field in the effective angle. Ferrite size, shape, and configuration impacts the gain performance. Ferrites may be uniformly distributed between the coils and the mandrel in a series of rectangular inserts. Ferrites may also have a non-uniform distribution. The ferrites may be comprised of one or more inserts of the same shape, but they may also comprise inserts of different shapes formed into a pattern. The shield design may also vary in shape or material. The shield comprises various slits aligned with the coils to allow transmission of signals from the antenna. The orientation, size, and spacing of the slits may be configured to achieve an optimal SNR. Varying one or more of the components of the ferrites and shield can increase the gain performance. Simulations are performed to model the antenna responses with different ferrite and shield configurations. The optimized ferrite and shield design is selected based on the maximum gain performance.

An effective angle study of the desired antenna orientation assesses the sensitivity of the design and the selection of the ferrites and shield design. In block 207, an effective angle was determined for the collocated antenna assembly at each of the tilted angles. This effective angle included the antenna coils and the mandrel of the tool. After ferrites and a shield design are selected based on the gain performance assessment, an effective angle is determined at each of the physical tilted angles for the collocated antenna assembly with the mandrel, ferrites, and shield. The effective angles with and without the ferrites and shield are compared to assess the sensitivity of the design since actual mechanical designs may have limitations associated with the design process and mechanical properties of the finished product. Similarity between the two effective angles at each physical tilted angle provide confidence in the selection of the ferrites and shield design.

The flowchart of FIG. 2 describes operations for optimizing antenna design of a collocated antenna assembly comprised of two antenna coils. However, it should be noted that the process can be applied to collocated antenna assemblies with any number of antenna coils. The operations of the flowchart of FIG. 2 are performed as described for each coil.

Figure 4:
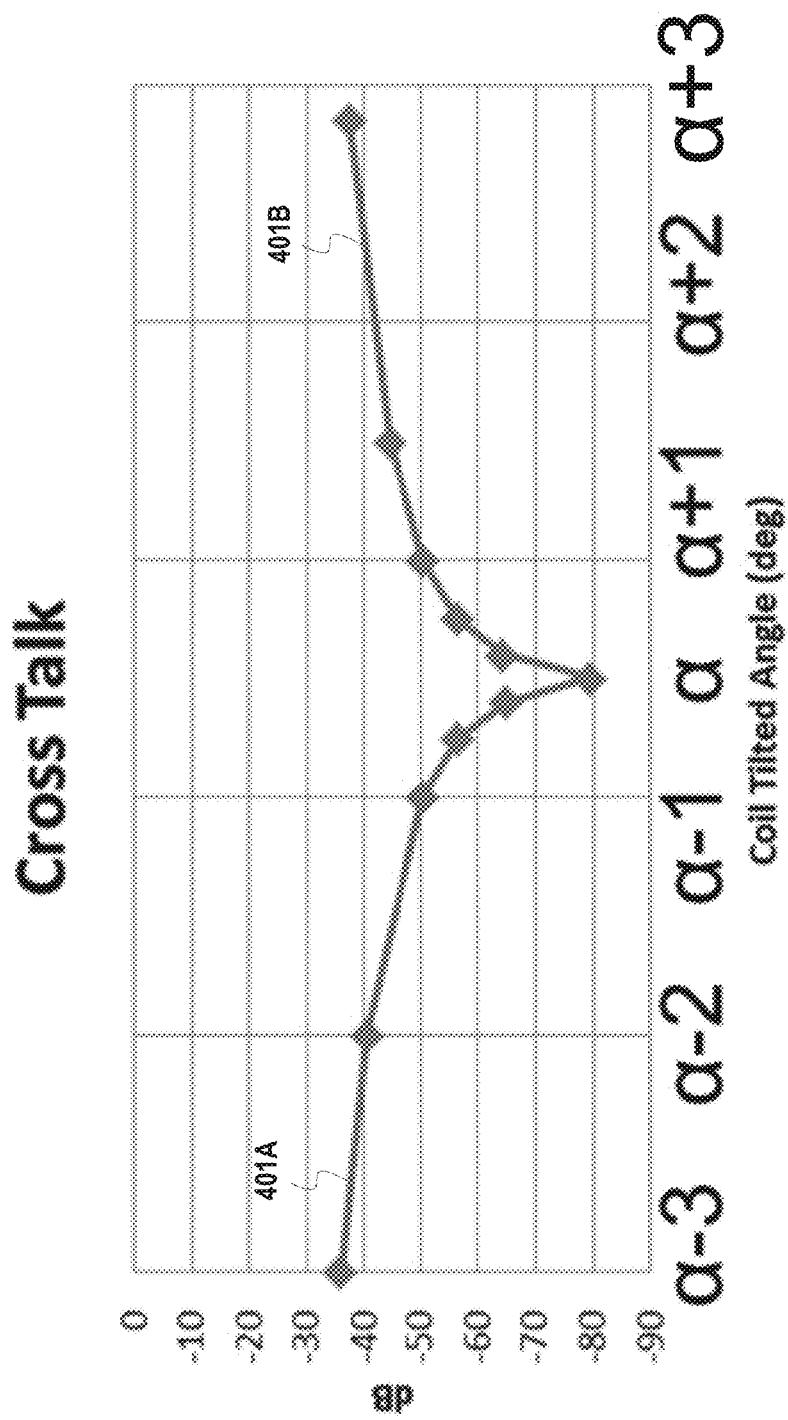
FIG. 4 is a graph of crosstalk between two antennas of a collocated antenna.

FIG. 4 is a graph of crosstalk between two antennas of a collocated antenna. FIG. 4 plots crosstalk of two coils of a collocated antenna at varying degrees of coil tilted angle. The graph of FIG. 4 has an x-axis of coil tilted angle in degrees and a y axis of decibels. The y-axis plots the crosstalk between the two antenna coils. A trend line comprises two trend line components 401A and 401B. Component 401A exhibits a decreasing trend in crosstalk as the tilted coil angle increases to angle $\alpha$. Angle $\alpha$ is a turning point of the graph. At angle $\alpha$, component 401B increases from a minimum y-value of −80 dB.

Figure 5:
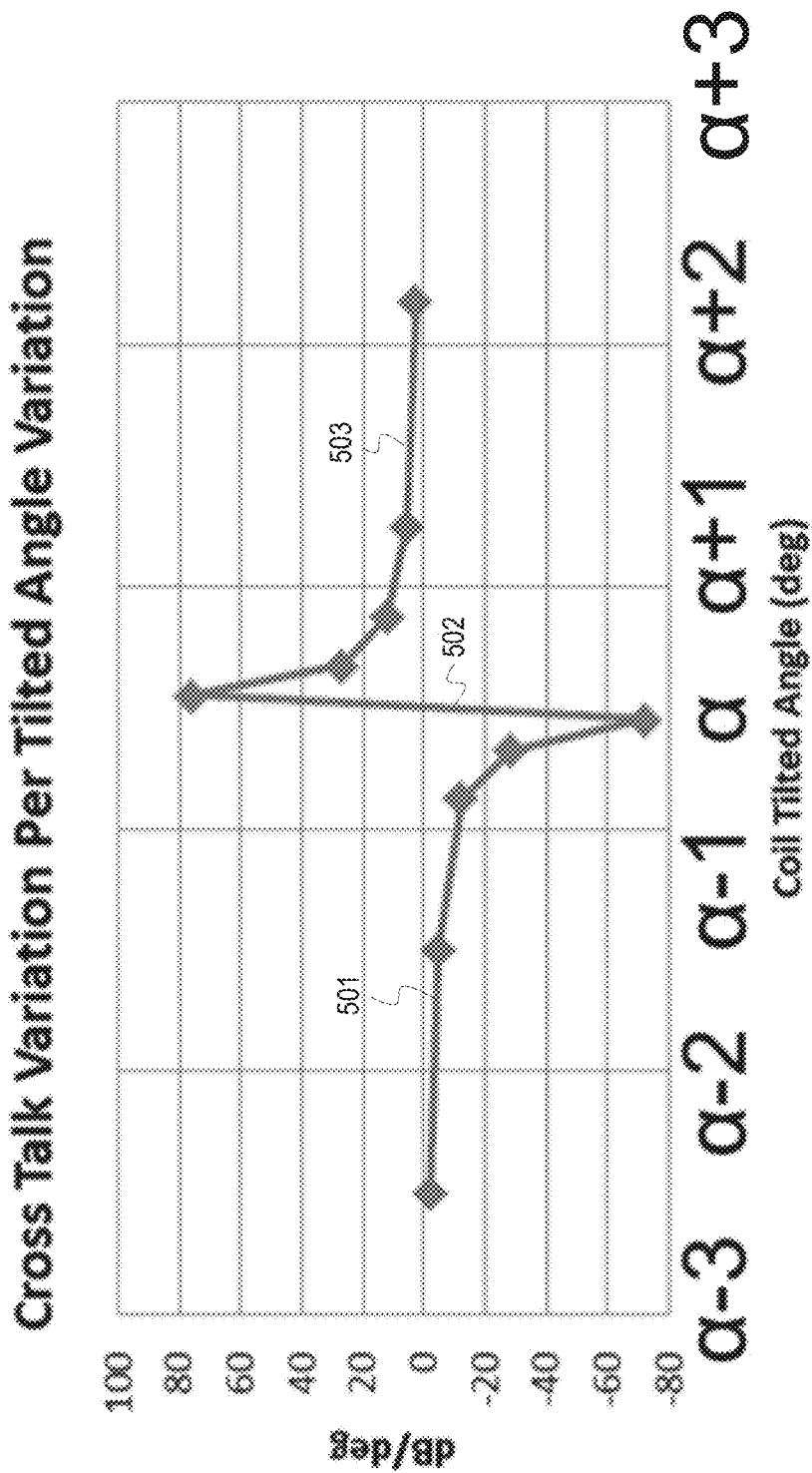
FIG. 5 is a graph of crosstalk variation per tilted angle variation for a collocated antenna.

FIG. 5 is a graph of crosstalk variation per tilted angle variation for a collocated antenna. FIG. 5 is a derivative of the graph of FIG. 4. The graph of FIG. 5 displays 3 trends in the data defined around the coil titled angle $\alpha$. As coil tilted angles approach a from the negative (left), a trend line component 501 exhibits decreasing decibel values. At $\alpha$, a trend line component 502 exhibits an almost vertical increase before beginning a decreasing trend with a component 503. The trend line components indicate a unique behavior at angle $\alpha$. To avoid large variations in measurements while using a resistivity logging tool, the collocated antenna coil tilted angle is selected to align with the component 502.

Figure 6:
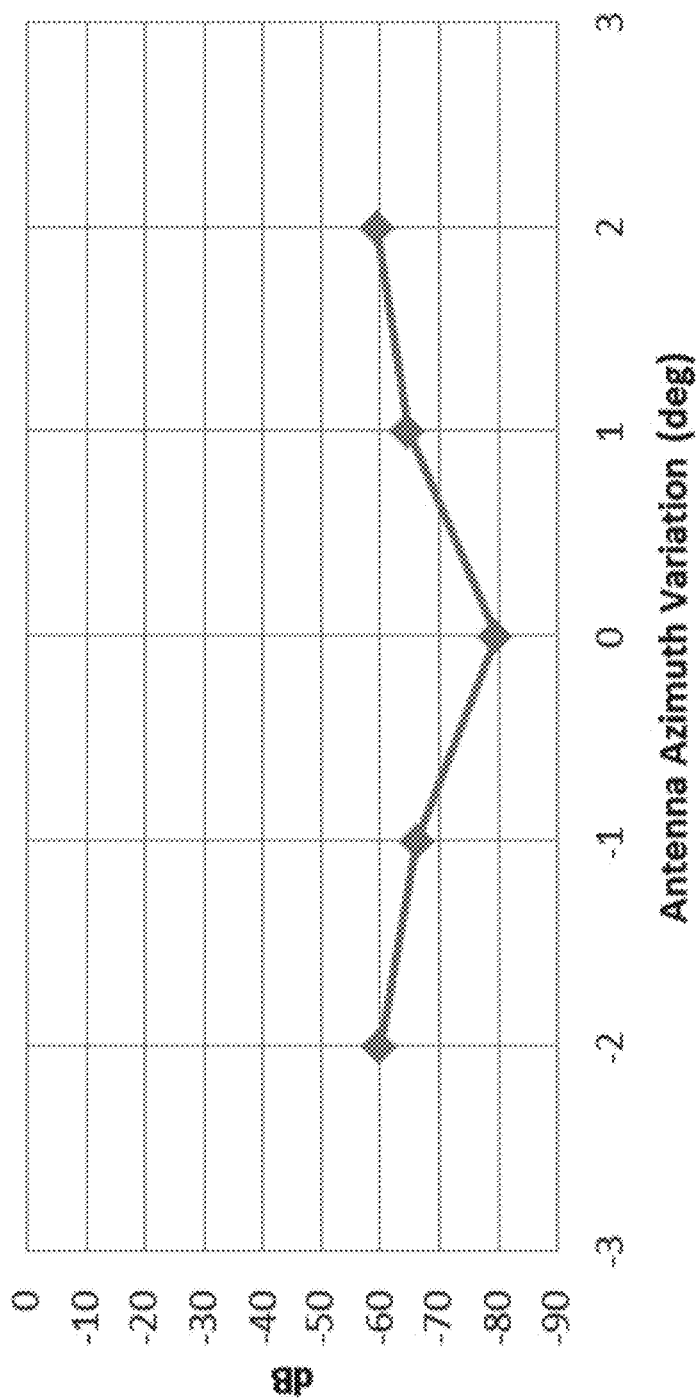
FIG. 6 is a graph of antenna crosstalk for different antenna azimuth variations.
Figure 7:
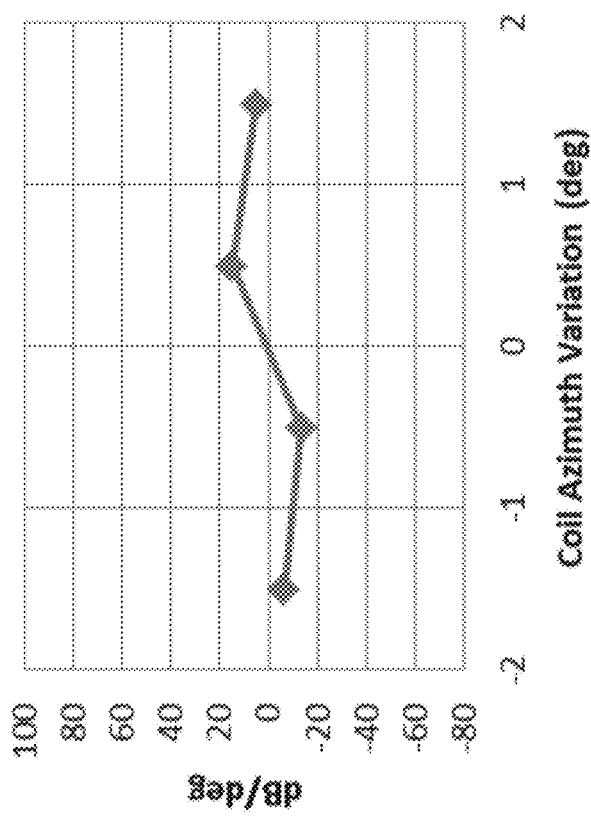
FIG. 7 is a graph of crosstalk variation per azimuth angle variation.

FIG. 6 is a graph of antenna crosstalk for different antenna azimuth variations. FIG. 6 depicts the sensitivity of the coils to changes in the azimuth angle. The graph depicts the lowest value for cross talk at zero degrees in variation. The crosstalk values increase as the variation from zero grow in both directions. Analyzing the antenna crosstalk variation with change in azimuth angle of the coils provides information about the sensitivity of a collocated antenna assembly. By studying the variation at different azimuth angles, the sensitivity of the design of the collocated antenna assembly is assessed. The mechanical design of the collocated antenna assembly may have some design tolerance due to limitations of the machine. Testing small variations in azimuth angle allows assessment of the design tolerance. By analyzing the derivative of the variation (FIG. 7), sensitivity is evaluated. Sharp changes in the direction of the trend line may indicate greater sensitivity of the collocated antenna assembly. FIG. 7 depicts gradual increases and decreases in the data trends with coil azimuth variation. This can be indicative of a good angle selection and minimization of potential errors in measurements due to tool sensitivity.

Example System

Figure 8:
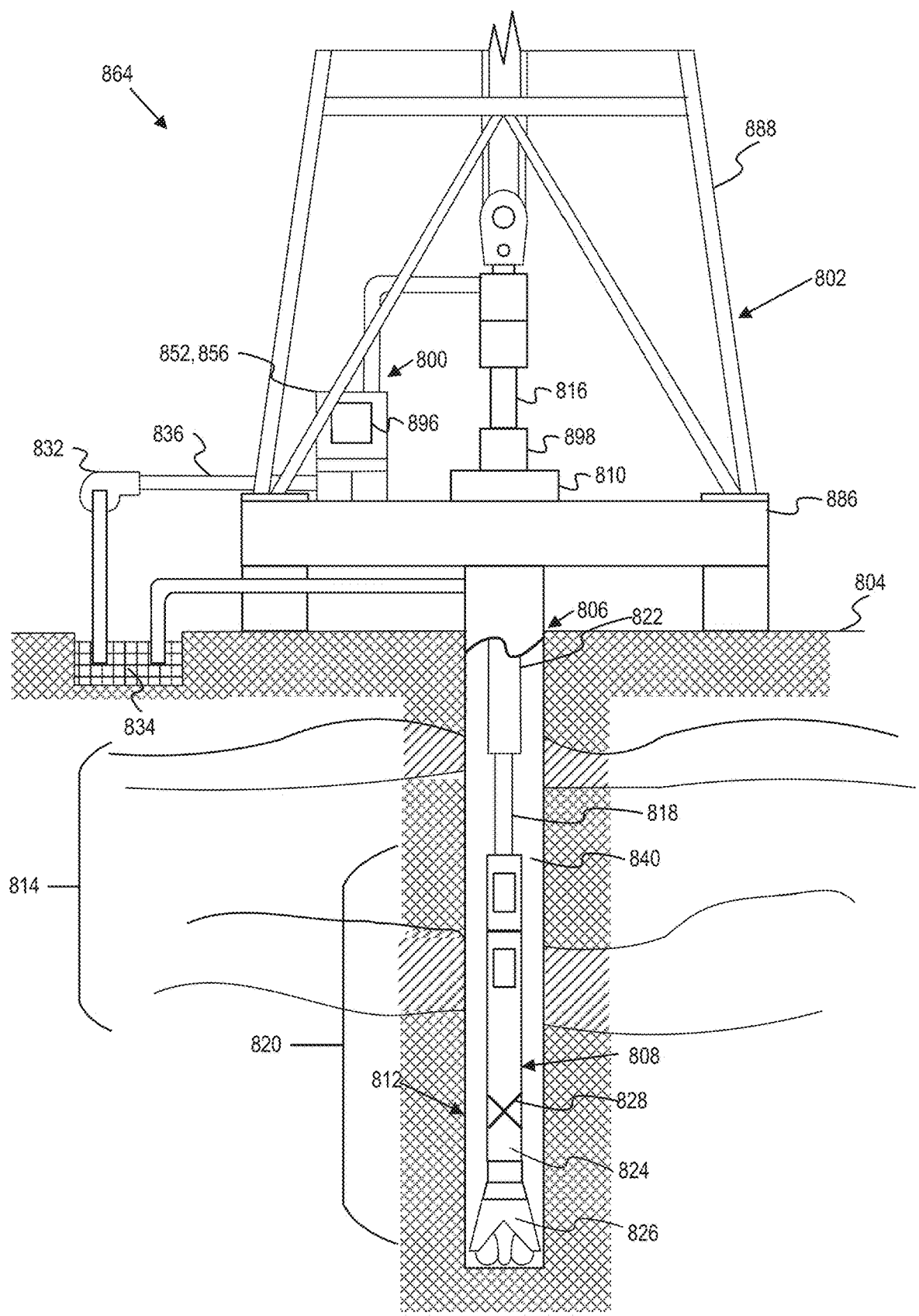
FIG. 8 is an elevation view of a drilling rig system, according to some embodiments.

FIG. 8 is an elevation view of a drilling rig system, according to some embodiments. A system 864 forms a portion of a drilling rig 802 located at the surface 804 of a well 806. Drilling of oil and gas wells is commonly carried out using a string of drill pipes connected to form a drilling string 808 that is lowered through a rotary table 810 into a wellbore or borehole 812. Here a drilling platform 886 is equipped with a derrick 888 that supports a hoist.

The drilling rig 802 thus provides support for the drill string 808. The drill string 808 operates to penetrate the rotary table 810 for drilling the borehole 812 through subsurface formations 814. The drill string 808 includes a Kelly 816, drill pipe 818, and a bottom hole assembly 820, located at the lower portion of the drill pipe 818.

The bottom hole assembly 820 includes drill collars 822, a down hole tool 824, and a drill bit 826. The drill bit 826 may operate to create a borehole 812 by penetrating the surface 804 and subsurface formations 814. The down hole tool 824 may comprise any of a number of different types of tools including MWD tools, LWD tools, and others. A collocated antenna 828 is coupled to the down hole tool 824.

During drilling operations, the drill string 808 (perhaps including the Kelly 816, the drill pipe 818, and the bottom hole assembly 820) are rotated by the rotary table 810. In addition to, or alternatively, the bottom hole assembly 820 may also be rotated by a motor (e.g., a mud motor) that is located down hole. The drill collars 822 may be used to add weight to the drill bit 826. The drill collars 822 may also operate to stiffen the bottom hole assembly 820, allowing the bottom hole assembly 820 to transfer the added weight to the drill bit 826, and in turn, to assist the drill bit 826 in penetrating the surface 804 and subsurface formations 814.

During drilling operations, a mud pump 832 pumps drilling fluid (sometimes known by those of ordinary skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 812. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation 814 cuttings created by operating the drill bit 826.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a RAM, a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Using the apparatus, systems, and methods disclosed herein may provide the ability to more efficiently conduct downhole operations, including operations that involve EPS motors and cables.

Figure 9:
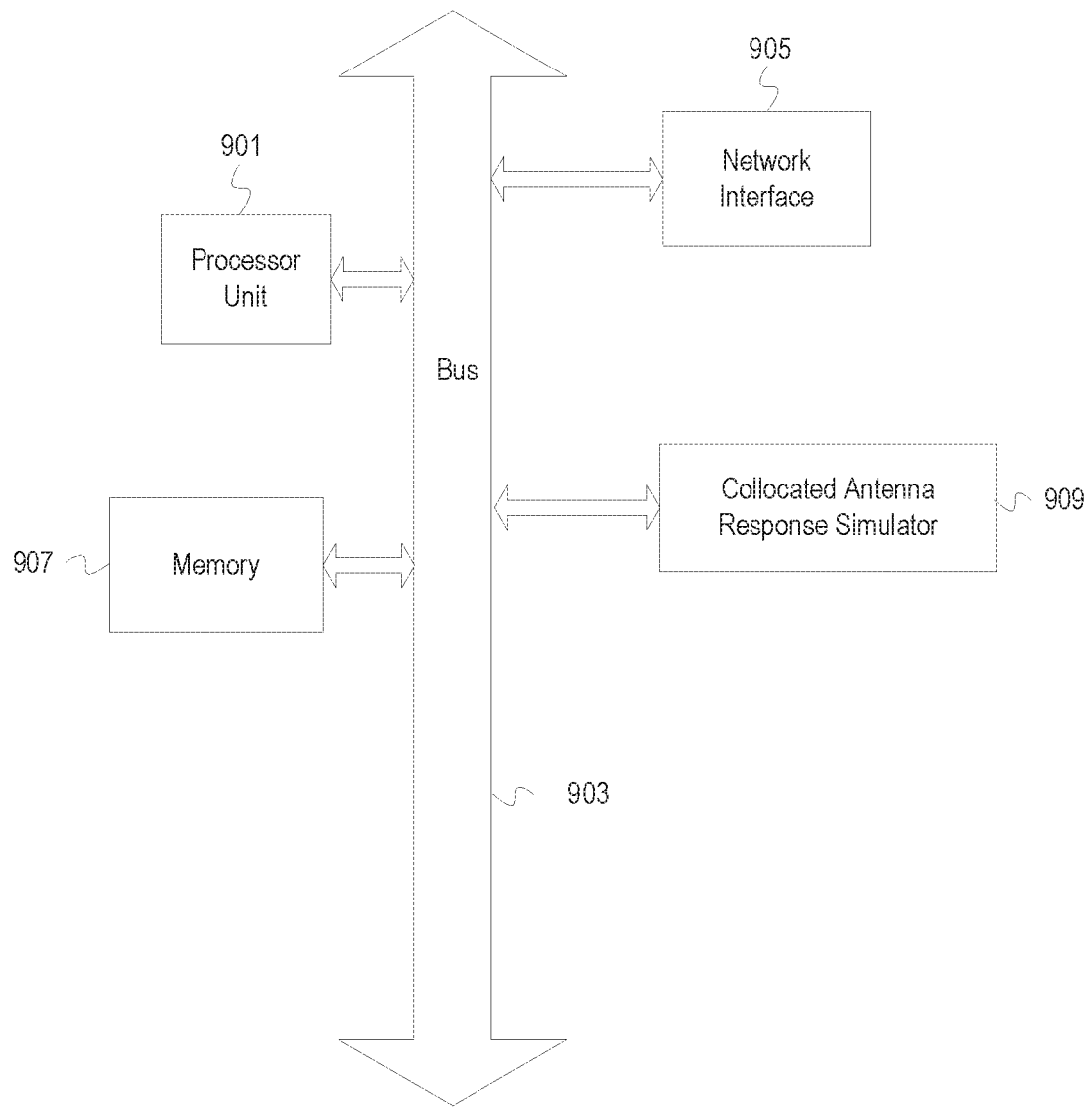
FIG. 9 is an example computer for designing collocated antennas.

FIG. 9 is an example computer for optimizing collocated antenna design. The system includes a processor 901 (possibly including multiple processors, multiple cores, multiple nodes, and/or implementing multi-threading, etc.). The system includes memory 907. The memory 907 may be system memory or any one or more of the above already described possible realizations of machine-readable media. The system also includes a bus 903 and a network interface 905.

The system also includes a collocated antenna response simulator 909. The collocated antenna response simulator 909 may perform operations of modelling responses of collocated antenna coils at various simulated angular configurations. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

Example Embodiments

Embodiment 1: A method comprising: determining a plurality of responses at a plurality of tilted angles for multiple coils of a collocated antenna assembly based on at least one coil parameter of the collocated antenna assembly, wherein the at least one coil parameter comprises at least one of a number of coil turns, a coil size, and a number of coils; determining crosstalk between the multiple coils at each of the plurality of tilted angles from the plurality of responses; determining a signal-to-noise ratio for each of the plurality of tilted angles based on the crosstalk; and selecting a tilted angle for the collocated antenna assembly corresponding to an optimal signal-to-noise ratio of the determined signal-to-noise ratios.

Embodiment 2: The method of Embodiment 1, wherein determining the crosstalk between the multiple coils comprises determining the crosstalk between the multiple coils based on at least one attribute of a resistivity tool on which the collocated antenna assembly is to be placed.

Embodiment 3: The method of either Embodiments 1 or 2, wherein at least one ferrite is to be positioned between the collocated antenna assembly and a mandrel of a resistivity tool on which the collocated antenna assembly is mounted, and wherein the method comprises selecting an attribute of the at least one ferrite to maximize a gain performance of the collocated antenna assembly while maintaining an effective angle similar to the selected tilted angle.

Embodiment 4: The method of Embodiment 3, wherein the attribute of the at least one ferrite comprises at least one of a number, a size, a shape, and a distribution.

Embodiment 5: The method of either Embodiments 3 or 4, wherein a shield is to be positioned to protect the collocated antenna assembly from damage due to downhole drilling conditions, and wherein the method comprises selecting an attribute of the shield to maximize the gain performance of the collocated antenna assembly while maintaining the effective angle similar to the selected tilted angle.

Embodiment 6: The method of Embodiment 5, wherein the attribute of the shield comprises at least one of a shape, a material, and an orientation, a size, and a spacing of slits aligned with the multiple coils of the collocated antenna assembly.

Embodiment 7: The method of either Embodiments 5 or 6 further comprising constructing a collocated antenna assembly with antenna coils configured at the selected tilted angle with the at least one ferrite and the shield to maximize the gain performance of the collocated antenna assembly.

Embodiment 8: One or more non-transitory machine-readable media comprising program code for determining a configuration of a collocated antenna assembly, the program code to: determine a plurality of responses at a plurality of tilted angles for multiple coils of the collocated antenna assembly based, on at least one coil parameter of the collocated antenna assembly, wherein the at least one coil parameter comprises at least one of a number of coil turns, a coil size, and a number of coils; determine crosstalk between the multiple coils at each of the plurality of tilted angles from the plurality of responses; determine a signal-to-noise ratio for each of the plurality of tilted angles based on the crosstalk; and select a tilted angle for the collocated antenna assembly corresponding to an optimal signal-to-noise ratio of the determined signal-to-noise ratios.

Embodiment 9: The one or more non-transitory machine-readable media of Embodiment 8, wherein the program code to determine the crosstalk between the multiple coils comprises program code to determine the crosstalk between the multiple coils based on at least one attribute of a resistivity tool on which the collocated antenna assembly is to be placed.

Embodiment 10: The one or more non-transitory machine-readable media of either Embodiments 8 or 9, wherein at least one ferrite is to be positioned between the collocated antenna assembly and a mandrel of a resistivity tool on which the collocated antenna assembly is mounted, and wherein the program code comprises program code to select an attribute of the at least one ferrite to maximize a gain performance of the collocated antenna assembly while maintaining an effective angle similar to the selected tilted angle.

Embodiment 11: The one or more non-transitory machine-readable media of Embodiment 10, wherein the attribute of the at least one ferrite comprises at least one of a number, a size, a shape, and a distribution.

Embodiment 12: The one or more non-transitory machine-readable media of either Embodiments 10 or 11, wherein a shield is to be positioned to protect the collocated antenna assembly from damage due to downhole drilling conditions, and wherein the program code comprises program code to select an attribute of the shield to maximize the gain performance of the collocated antenna assembly while maintaining the effective angle similar to the selected tilted angle.

Embodiment 13: The one or more non-transitory machine-readable media of Embodiment 12, wherein the attribute of the shield comprises at least one of a shape, a material, and an orientation, a size, and a spacing of slits aligned with the multiple coils of the collocated antenna assembly.

Embodiment 14: A resistivity tool comprising: a mandrel having an axial line of symmetry; and a collocated antenna assembly having multiple coils and mounted on the mandrel, wherein the collocated antenna assembly has a tilted angle relative to the axial line of symmetry, wherein the tilted angle is selected based on at least one coil parameter that comprises at least one of a number of coil turns, a coil size, and a number of coils, a crosstalk between the multiple coils that is caused at least in part by the at least coil parameter, and a signal-to-noise ratio that is based on the crosstalk.

Embodiment 15: The resistivity tool of Embodiment 14, further comprising at least one ferrite positioned between the collocated antenna assembly and the mandrel.

Embodiment 16: The resistivity tool of Embodiment 15, wherein an attribute of the at least one ferrite is selected to maximize a gain performance of the collocated antenna assembly while maintaining an effective angle similar to the selected tilted angle.

Embodiment 17: The resistivity tool of either Embodiments 15 or 16, wherein the attribute of the at least one ferrite comprises at least one of a number, a size, a shape, and a distribution.

Embodiment 18: The resistivity tool of either Embodiments 16 or 17, further comprising a shield positioned to protect the collocated antenna assembly from damage due to downhole drilling conditions, wherein an attribute of the shield is selected to maximize the gain performance of the collocated antenna assembly while maintaining the effective angle similar to the selected tilted angle.

Embodiment 19: The resistivity tool of Embodiment 18, wherein the attribute of the shield comprises at least one of a shape, a material, and an orientation, a size, and a spacing of slits aligned with the multiple coils of the collocated antenna assembly.

Embodiment 20: The resistivity tool of Embodiments 14, wherein the tilted angle is selected based on a determination of a plurality of responses at a plurality of tilted angles for the multiple coils based on the at least one of one coil parameter; a determination of the crosstalk between the multiple coils at each of the plurality of tilted angles from the plurality of responses; a determination of the signal-to-noise ratio for each of the plurality of tilted angles based on the crosstalk; and a selection of the tilted angle for the collocated antenna assembly corresponding to an optimal signal-to-noise ratio of the determined signal-to-noise ratios.

While the aspects of the disclosure are described with reference to various implementations and exploitations, it will be understood that these aspects are illustrative and that the scope of the claims is not limited to them. In general, optimizing the process for collocated antenna design as described herein may be implemented with facilities consistent with any hardware system or hardware systems. Many variations, modifications, additions, and improvements are possible.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   simulating a plurality of responses at a plurality of tilted angles for one or more coil pairs of a collocated antenna assembly based on at least one coil parameter of the collocated antenna assembly, wherein each coil pair includes two coils oriented at different tilted angles, and wherein the at least one coil parameter comprises at least one of a number of coil turns, a coil size, and a number of coils;
   determining crosstalk between each coil of the coil pairs based on the simulated responses;
   determining a signal-to-noise ratio for each of the coil pairs based on the crosstalk; and
   selecting an effective tilted angle from the plurality of tilted angles for each coil of the coil pairs of the collocated antenna assembly, the effective tilted angle corresponding to an optimal signal-to-noise ratio of the determined signal-to-noise ratios.

2. The method of claim 1, wherein determining the crosstalk comprises determining the crosstalk between each coil of the coil pairs based on at least one attribute of a resistivity tool on which the collocated antenna assembly is to be placed.

3. The method of claim 1,
   wherein at least one ferrite is to be positioned between the collocated antenna assembly and a mandrel of a resistivity tool on which the collocated antenna assembly is mounted, and
   wherein the method comprises selecting an attribute of the at least one ferrite to maximize a gain performance of the collocated antenna assembly while maintaining an effective angle similar to the selected effective tilted angle.

4. The method of claim 3, wherein the attribute of the at least one ferrite comprises at least one of a number, a size, a shape, and a distribution.

5. The method of claim 3,
   wherein a shield is to be positioned to protect the collocated antenna assembly from damage due to downhole drilling conditions, and
   wherein the method comprises selecting an attribute of the shield to maximize the gain performance of the collocated antenna assembly while maintaining the effective angle similar to the selected effective tilted angle.

6. The method of claim 5, wherein the attribute of the shield comprises at least one of a shape, a material, and an orientation, a size, and a spacing of slits aligned with the multiple coils of the collocated antenna assembly.

7. The method of claim 5 further comprising constructing the collocated antenna assembly with each coil of the coil pairs configured at the selected effective tilted angle with the at least one ferrite and the shield to maximize the gain performance of the collocated antenna assembly.

8. One or more non-transitory machine-readable media comprising program code for determining a configuration of a collocated antenna assembly, the program code to:
   simulate a plurality of responses at a plurality of tilted angles for one or more coil pairs of the collocated antenna assembly based, on at least one coil parameter of the collocated antenna assembly, wherein each coil pair includes two coils oriented at different tilted angles, and wherein the at least one coil parameter comprises at least one of a number of coil turns, a coil size, and a number of coils;
   determine crosstalk between each coil of the coil pairs based on the simulated responses;
   determine a signal-to-noise ratio for each of the plurality of tilted angles based on the crosstalk; and
   select an effective tilted angle from the plurality of tilted angles for each coil of the coil pairs of the collocated antenna assembly, the effective tilted angle corresponding to an optimal signal-to-noise ratio of the determined signal-to-noise ratios.

9. The one or more non-transitory machine-readable media of claim 8, wherein the program code to determine the crosstalk between each coil of the the multiple coil pairs coils comprises program code to determine the crosstalk between each coil of the multiple coil pairs based on at least one attribute of a resistivity tool on which the collocated antenna assembly is to be placed.

10. The one or more non-transitory machine-readable media of claim 8,
    wherein at least one ferrite is to be positioned between the collocated antenna assembly and a mandrel of a resistivity tool on which the collocated antenna assembly is mounted, and wherein the program code comprises program code to select an attribute of the at least one ferrite to maximize a gain performance of the collocated antenna assembly while maintaining an effective angle similar to the selected tilted angle.

11. The one or more non-transitory machine-readable media of claim 10, wherein the attribute of the at least one ferrite comprises at least one of a number, a size, a shape, and a distribution.

12. The one or more non-transitory machine-readable media of claim 10,
   wherein a shield is to be positioned to protect the collocated antenna assembly from damage due to downhole drilling conditions, and
   wherein the program code comprises program code to select an attribute of the shield to maximize the gain performance of the collocated antenna assembly while maintaining the effective angle similar to the selected effective tilted angle.

13. The one or more non-transitory machine-readable media of claim 12, wherein the attribute of the shield comprises at least one of a shape, a material, and an orientation, a size, and a spacing of slits aligned with the coil pairs of the collocated antenna assembly.

14. A resistivity tool comprising:
   a mandrel having an axial line of symmetry; and
   a collocated antenna assembly having one or more coil pairs mounted on the mandrel, wherein each coil pair includes two coils oriented at different tilted angles relative to the axial line of symmetry, wherein the tilted angle of each coil is selected based on
      a simulation of responses at a plurality of tilted angles for each of the coil pairs based on at least one coil parameter that indicates at least one of a number of coil turns, a coil size, and a number of coils,
      a crosstalk between the coil pairs based on the simulation responses, and
      a signal-to-noise ratio that is based on the crosstalk.

15. The resistivity tool of claim 14, further comprising at least one ferrite positioned between the collocated antenna assembly and the mandrel.

16. The resistivity tool of claim 15, wherein an attribute of the at least one ferrite is selected to maximize a gain performance of the collocated antenna assembly.

17. The resistivity tool of claim 16, wherein the attribute of the at least one ferrite comprises at least one of a number, a size, a shape, and a distribution.

18. The resistivity tool of claim 16, further comprising a shield positioned to protect the collocated antenna assembly from damage due to downhole drilling conditions, wherein an attribute of the shield is selected to maximize the gain performance of the collocated antenna assembly.

19. The resistivity tool of claim 18, wherein the attribute of the shield comprises at least one of a shape, a material, and an orientation, a size, and a spacing of slits aligned with the multiple coils of the collocated antenna assembly.

* * * * *